(12) United States Patent
Xiao et al.

(10) Patent No.: US 9,688,326 B2
(45) Date of Patent: Jun. 27, 2017

(54) ROBOTIC DEVICE FOR NAVIGATING INCLINED SURFACES

(71) Applicants: Research Foundation of the City University of New York, New York, NY (US); InnovBot, LLC, Yorktown Heights, NY (US)

(72) Inventors: Jizhong Xiao, River Edge, NJ (US); Kenshin Ushiroda, Forest Hills, NY (US)

(73) Assignees: Research Foundation of The City University of New York, New York, NY (US); InnovBot, LLC, Yorktown Heights, NY (US)

( * ) Notice: Subject to any disclaimer, the term of this patent is extended or adjusted under 35 U.S.C. 154(b) by 0 days.

(21) Appl. No.: 14/769,183

(22) PCT Filed: Mar. 13, 2014

(86) PCT No.: PCT/US2014/026125
§ 371 (c)(1),
(2) Date: Aug. 20, 2015

(87) PCT Pub. No.: WO2014/160238
PCT Pub. Date: Oct. 2, 2014

(65) Prior Publication Data
US 2015/0375814 A1    Dec. 31, 2015

Related U.S. Application Data

(60) Provisional application No. 61/779,047, filed on Mar. 13, 2013.

(51) Int. Cl.
*B62D 55/265*    (2006.01)

(52) U.S. Cl.
CPC ........... *B62D 55/265* (2013.01); *Y10S 901/01* (2013.01)

(58) Field of Classification Search
CPC ..................... B62D 55/265; Y10S 901/01
(Continued)

(56) References Cited

U.S. PATENT DOCUMENTS 3,276,529 A    10/1966    Latimer-Needham
3,991,842 A    11/1976    Larsen
(Continued)

FOREIGN PATENT DOCUMENTS

CN    203122277    8/2013
DE    10140990    3/2003
(Continued)

OTHER PUBLICATIONS

Machine Translation of DE 10140990 B4, Jun. 2009, Germany, Vollmer Hubert.*
(Continued)

*Primary Examiner* — Kevin Hurley
*Assistant Examiner* — Felicia L Brittman
(74) *Attorney, Agent, or Firm* — Peter J. Mikesell; Schmeiser, Olsen & Watts, LLP (57) ABSTRACT

A drive unit for driving a robot along an inclined surface is disclosed. An endless tread engages a pair of wheels to define a planar bottom surface of the endless tread. A vacuum motor pulls air through holes in the endless tread when the holes are aligned with a vacuum opening.

18 Claims, 7 Drawing Sheets

(58) Field of Classification Search
USPC .......................................................... 180/164
See application file for complete search history.

(56) References Cited

U.S. PATENT DOCUMENTS

| | | | |
|---|---|---|---|
| 4,664,212 A | | 5/1987 | Nagatsuka et al. |
| 4,699,252 A | * | 10/1987 | Sing .................... B60T 1/14 |
| | | | 180/15 |
| 5,487,440 A | * | 1/1996 | Seemann ............. B62D 55/265 |
| | | | 180/164 |
| 5,655,247 A | | 8/1997 | Allen et al. |
| 5,890,250 A | | 4/1999 | Lange et al. |
| 6,964,312 B2 | | 11/2005 | Maggio |
| 6,971,141 B1 | | 12/2005 | Tak |
| 7,076,335 B2 | | 7/2006 | Seemann |
| 7,099,746 B2 | | 8/2006 | Ross et al. |
| 7,404,464 B2 | | 7/2008 | Imus et al. |
| 7,520,356 B2 | * | 4/2009 | Sadegh ............. B62D 49/0621 |
| | | | 180/127 |
| 7,775,312 B2 | | 8/2010 | Maggio |
| 8,127,390 B2 | | 3/2012 | Kim |
| 8,505,663 B2 | | 8/2013 | Saylor, Jr. |
| 8,661,598 B2 | | 3/2014 | Alshehhi |
| 2001/0048877 A1 | | 12/2001 | Illingworth et al. |
| 2005/0072612 A1 | | 4/2005 | Maggio |
| 2006/0278454 A1 | * | 12/2006 | Maggio ............. B62D 49/0635 |
| | | | 180/164 |
| 2015/0026909 A1 | | 1/2015 | Baek et al. |
| 2015/0027494 A1 | | 1/2015 | Ryu et al. |

FOREIGN PATENT DOCUMENTS

| | | |
|---|---|---|
| EP | 2781438 | 9/2014 |
| GB | 2420147 | 5/2006 |
| WO | WO2013019301 | 2/2013 |
| WO | WO2013048263 | 4/2013 |
| WO | WO2013082460 | 6/2013 |
| WO | WO2013117934 | 8/2013 |
| WO | WO2013156142 | 10/2013 |

OTHER PUBLICATIONS

Serbot Swiss Innvoations; Success Story, Serbot presents New Cleaning Solution for Solar Power Plants; Dec. 2012; pp. 1-2; CH.
Serbot Swiss Innvoations; Gekko Facade, Cleaning Robot for Large-Area Glass Facades on Building Technical Documentation; Jun. 7, 2013; pp. 1-7; CH.
Serbot Swiss Innvoations; Gekko Facade, Cleaning Robot for Large-Area Glass Facades on Building Technical Documentation; Jun. 5, 2015; pp. 1-8; CH.
ISA/US; International Search Report/Written Opinion for PCT/US2014/026125; Jul. 14, 2014; US.
EPO; Extended European Search Report dated Oct. 21, 2016 in EP application 14775708.2.

* cited by examiner

ROBOTIC DEVICE FOR NAVIGATING INCLINED SURFACES

CROSS-REFERENCE TO RELATED APPLICATIONS

This application claims priority to and benefit of U.S. Patent Application Ser. No. 61/779,047 (filed Mar. 13, 2013) the entirety of which is incorporated herein by reference.

STATEMENT OF FEDERALLY SPONSORED RESEARCH OR DEVELOPMENT

This invention was made with Government support under Contract No. IIP-1332027 awarded by the National Science Foundation (NSF). The Government has certain rights in this invention."

BACKGROUND OF THE INVENTION

The subject matter disclosed in this specification pertains to robotic devices that can move on inclined surfaces to overcome gaps and ledges. The devices may be used for building inspection, non-destructive evaluation, surveillance, cleaning and the like. Traditional wall-climbing robots often fail to operate on rough surfaces where gaps exists. It would be desirable to provide an improved robotic device that can navigate inclined surfaces.

The discussion above is merely provided for general background information and is not intended to be used as an aid in determining the scope of the claimed subject matter.

BRIEF DESCRIPTION OF THE INVENTION

A drive unit for driving a robot along an inclined surface is disclosed. An endless tread engages a pair of wheels to define a planar bottom surface of the endless tread. A vacuum motor pulls air through holes in the endless tread when the holes are aligned with a vacuum opening. An advantage that may be realized in the practice of some disclosed embodiments of the robot is that it can more easily navigate gaps in an inclined surface than prior art robots.

In a first embodiment, a drive unit for driving a robot is disclosed. The drive unit comprises a pair of wheels rotatably disposed relative to the body. An endless tread engages the pair of wheels to define a planar bottom surface of the endless tread, the endless tread having a plurality of holes with at least three holes in the plurality of holes being on the planar bottom surface. A vacuum motor connects to a vacuum opening that is aligned with the bottom surface such that the vacuum motor pulls air through at least one aligned hole when aligned with the vacuum opening, the at least one aligned hole being selected from the at least three holes.

In a second embodiment, a robot for navigating inclined surfaces is disclosed. The robot comprises a body disposed between a first drive unit and a second drive unit. The first drive unit and the second drive unit each comprise a pair of wheels rotatably disposed relative to the body. An endless tread engages the pair of wheels to define a planar bottom surface of the endless tread, the endless tread having a plurality of holes with at least three holes in the plurality of holes being on the planar bottom surface. A vacuum motor connects to a vacuum opening that is aligned with the bottom surface such that the vacuum motor pulls air through at least one aligned hole when aligned with the vacuum opening, the at least one aligned hole being selected from the at least three holes. A turbine for expelling air in a direction opposite the planar bottom surface is provided such that the planar bottom surface to pushed toward an inclined surface.

In a third embodiment, a robot for navigating inclined surfaces is disclosed. The robot comprises a body disposed between a first drive unit and a second drive unit, the body having at least one duct fan with an air intake on a bottom side of the body and an air exhaust on a top side of the body. The first drive unit and the second drive unit each comprise an endless tread engaging a pair of rotatable drive wheels to define a bottom surface and a top surface of the endless tread, the endless tread having a plurality of holes. A vacuum motor is connected to a vacuum opening that is aligned with the bottom surface such that the vacuum motor pulls air in through the plurality of holes when the plurality of holes are aligned with the vacuum opening and supplies the air to the at least one duct fan in the body causing the duct fan to rotate and apply a force that presses the robot toward the bottom surface.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which:

FIG. 1A is a perspective view of a first exemplary robot while

FIG. 3A is a top view of the first exemplary robot of FIG. 1A with endless treads removed while

FIG. 4A is a cross sectional view of the first exemplary robot of FIG. 1A while FIG. 4B is a perspective underside view of the exemplary robot of FIG. 1A;

FIG. 6A is a perspective underside view of a drive unit of the third exemplar robot of FIG. 5 while

DETAILED DESCRIPTION OF THE INVENTION

Figure 1A:
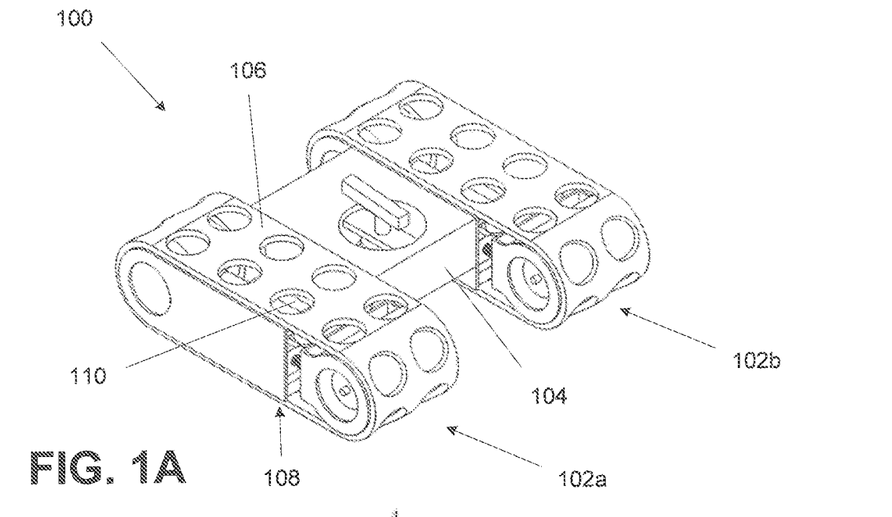
Figure 1B:
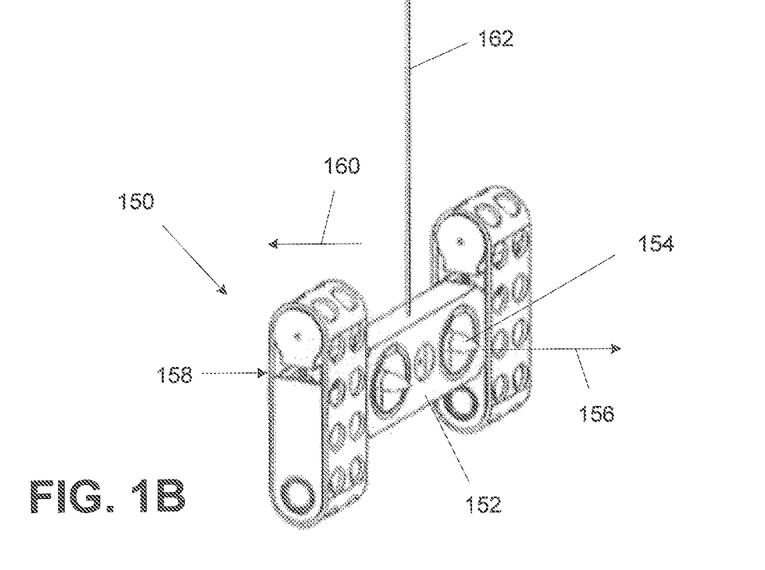
FIG. 1B is a perspective view of a second exemplary robot.

FIG. 1A is a perspective view of an exemplary robot 100 for navigating inclined surfaces. The robot 100 comprises a first drive unit 102a and a second drive unit 102b joined by a body 104. The first and second drive units 102a, 102b each have respective endless treads that engage a pair of wheels to define a top surface 106 and a planar bottom surface 108. The endless treads comprises a plurality of holes 110 arranged in at least one row. The first and second drive units 102a, 102b each have a vacuum motor that is connected to a vacuum chamber that is aligned with the planar bottom surface such that the vacuum motor pulls air through the holes that are on the planar bottom surface. The planar bottom surface has a length that is sufficient to ensure at least three holes contact an inclined surface. FIG. 1B is a perspective view of an exemplary robot 150 for navigating inclined surfaces. The robot 150 is substantially similar to the robot 100 of FIG. 1A except in that a body 152 of the robot 150 comprises at least one turbine 154 for expelling air in a first direction 156 opposite a planar bottom surface 158 such that the planar bottom surface 158 moves in a second direction 160 when suspended by a tether cable 162. A more detailed discussion of the components follows.

Figure 2:
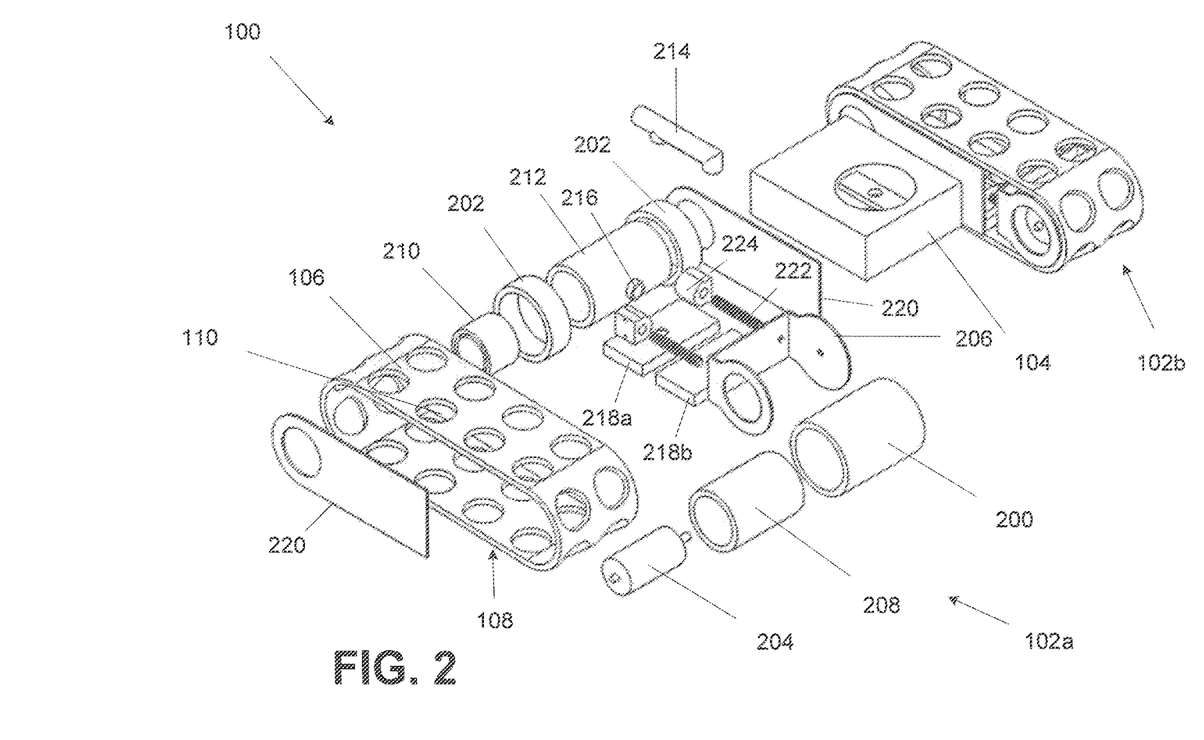
FIG. 2 is an exploded view of the first exemplary robot of FIG. 1A.

FIG. 2 is a schematic depiction of the robot 100 wherein the first drive unit 102a is shown in exploded format. The endless tread 106 engages a pair of wheels which, in the embodiment of robot 100, include a drive wheel 200 and a second wheel 202. The drive wheel 200 is driven by drive motor 204 which is fixedly connected to a motor mount 206. The drive motor 204 frictionally engages the drive wheel 35 through sleeve 208 such that operation of the drive motor causes the drive wheel 200 to rotate and thereby actuate the endless tread 106. The drive wheel 200 may engage the endless tread 106 through friction connection or through a plurality of teeth that pass through the plurality of holes 110. A vacuum motor 210 provides a vacuum to vacuum hub 212 which is connected to a vacuum manifold 214 through an opening 216. The vacuum manifold 214, in turn, provides a vacuum to vacuum chambers 218a, 218b. The vacuum chambers 218a, 218b provide vacuum openings on their underside that are aligned with the planar bottom surface 108 of the endless tread 106. As holes in the plurality of holes 118 align with the vacuum openings, air is pulled through the aligned holes, thereby creating a suction attachment between the planar bottom surface 108 and the inclined surface. A frame 220 provides rigidity to the robot 100. To provide adjustable tension to the endless tread 106, the motor mount 206 may have one or more screws 222 that are received by threaded receptacles 224 which are fixedly connected to the frame 220. Operation of the screws 222 moves the motor mount 206 toward or away from the second wheel 202 and thereby tensions or relaxes the endless tread 106.

Figure 3A:
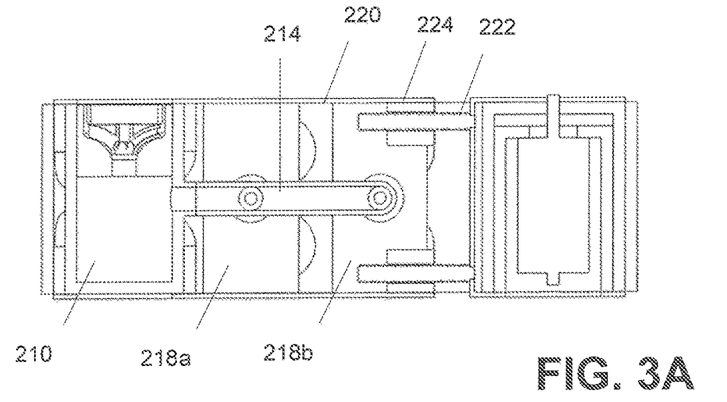
Figure 3B:
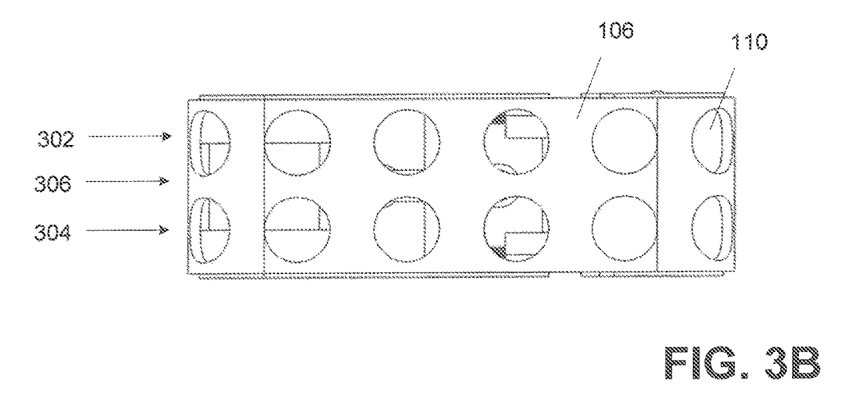
FIG. 3B is a top view of the first exemplary robot of FIG. 1A with endless treads shown.

FIG. 3A is a top view of the robot 100 with the endless tread 106 removed. FIG. 3B is a top view of the robot 100 with the endless tread 106 shown. The plurality of holes 110 in the endless tread 106 are arranged in a first row 302 and a second row 304 with a solid portion 306 of the endless thread disposed between the first row 302 and the second row 304. Adjacent holes in respective rows simultaneously contact the vacuum opening provided by the vacuum chambers.

Figures 4A, 4B:
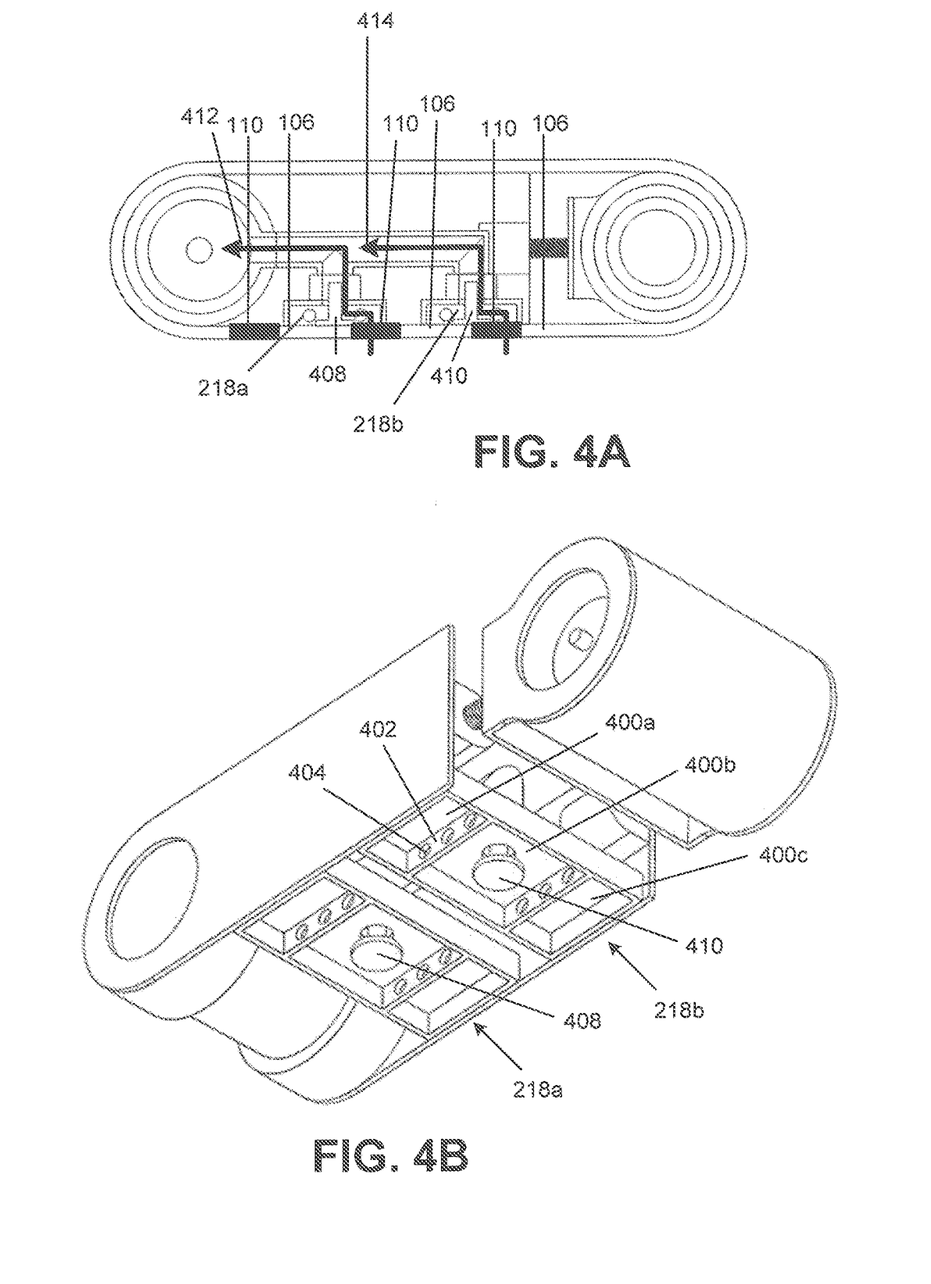

FIG. 4A is a cross sectional view of the robot 100 showing the relative orientation of the vacuum chambers 218a, 218b and the plurality of holes 110. FIG. 4B is a perspective view of the bottom of robot 100. As shown in FIG. 4B, the vacuum chambers 218a, 218b each present vacuum openings to the planar bottom surface. The vacuum chambers 218a, 218b are provided with at least one support structure that prevents the endless tread 106 from collapsing inward when the vacuum is active. In the embodiment of FIG. 4A, each vacuum chamber is segmented into sub-chambers. For example, the vacuum chamber 218 is segmented into sub-chambers 400a, 400b and 400c. The sub-chambers 400a and 400b are segmented by a supporting rib 402 that supports the endless tread 106. The supporting bar 402 has at least one hole 404 that permits the vacuum to reach both the sub-chambers 400a and 400b. The sub-chamber 400c is configured in a manner analogous to sub-chamber 400a. The sub-chamber 400b of vacuum chamber 218b comprises a valve 410 over a hole that leads to the vacuum manifold 214. The valve 410 is actuated to open and close the vacuum chamber 219b. The valve 410 closes when the vacuum chamber 218b is above a predetermined threshold pressure so as not to effect the pressure in the vacuum chamber 218a, thereby allowing at least one of the vacuum chambers to maintain vacuum. In one embodiment, the valve 410 is actuated by one or more springs that provide a predetermined resistance. In another embodiment, the valve 410 is actuated by sensors and actuators that may, for example, by controlled through control signals sent through a tether cable. The vacuum chamber 218b comprises a corresponding valve 408 in its sub-chamber.

The vacuum chambers 218a, 218b have a width substantially equal to a width of the endless tread 106. In use, endless tread 106 rotates over the pair of wheels so as to place holes over the vacuum chambers 218a, 218b. In the embodiment of FIG. 4A, the vacuum chamber 218a pulls air in the direction of arrow 412 through an aligned hole in the plurality of holes 110. This creates a suction attachment to the surface under the hole. Likewise, the vacuum chamber 218b pulls air in the direction of arrow 414 through an aligned hole in the plurality of holes 110. As the endless tread advances, different holes in the plurality of holes 110 become aligned with the vacuum chambers 218a, 218b. To the extent the seal about any one hole is adequate, the suction attachment provided by vacuum chambers 218a, 218b can be maintained. Should a leak occur due to an imperfect seal or due to encountering a crack that breaks the seal entirely, the remaining holes maintain the suction connection until such time as the hole is realigned with a vacuum chamber and the suction attachment is reestablished.

Figure 5:
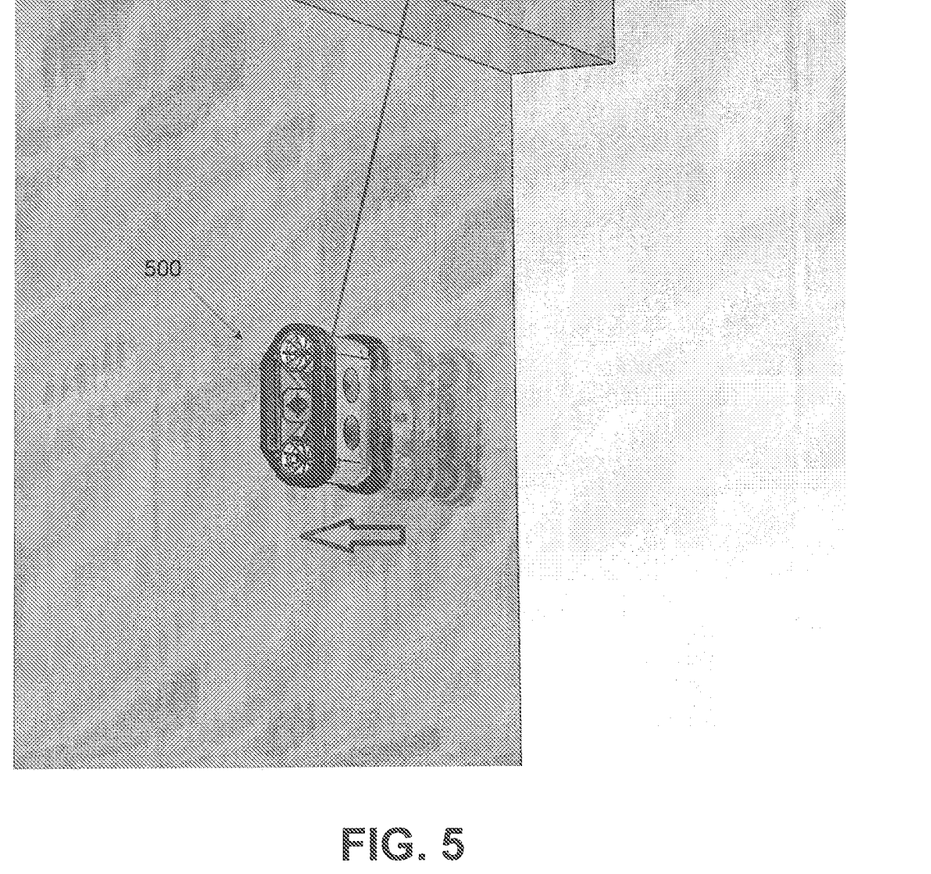
FIG. 5 is a perspective view of a third exemplary robot.

The robots disclosed in this specification are particularly useful for building inspection, non-destructive evaluation, surveillance, cleaning vertical or inclined surfaces and the like. For example, and with reference to FIG. 1B, the robot may be lowered over the side of a structure by the tether cable 162. The tether cable 162 provides both a mechanical tether to support the robot as well as provides power for the vacuum motor 210 and drive motor 204. Control signals may be sent through the tether cable 162 to control the motion of the robot. Should the robot lose its suction attachment to the side of the structure, turbines such as turbines 154 can be used to push the robot against the side of the structure where the suction attachment can be reestablished. See FIG. 5 which depicts an exemplary robot 500 being pushed from a dangling position to a wall-climbing position by a turbine. Robot 500 is described in further detail below.

Figure 6A:
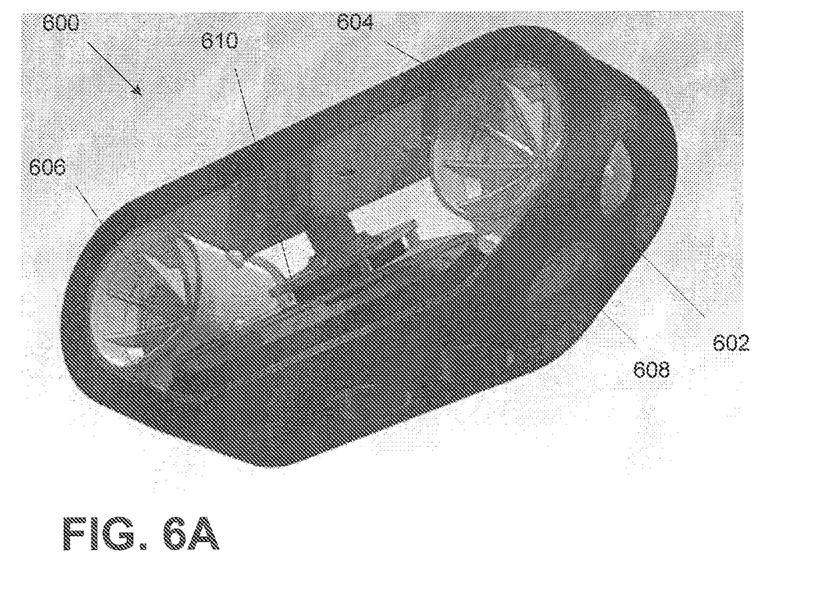

FIG. 6A is a drive unit 600 for use with the robot 500. The drive unit 600 comprises an endless tread 602 that engages a pair of wheels 604, 606. The endless tread 602 has a plurality of holes that connect to a vacuum chamber (not shown in FIG. 6A) provided by vacuum motor 610.

Figure 6B:
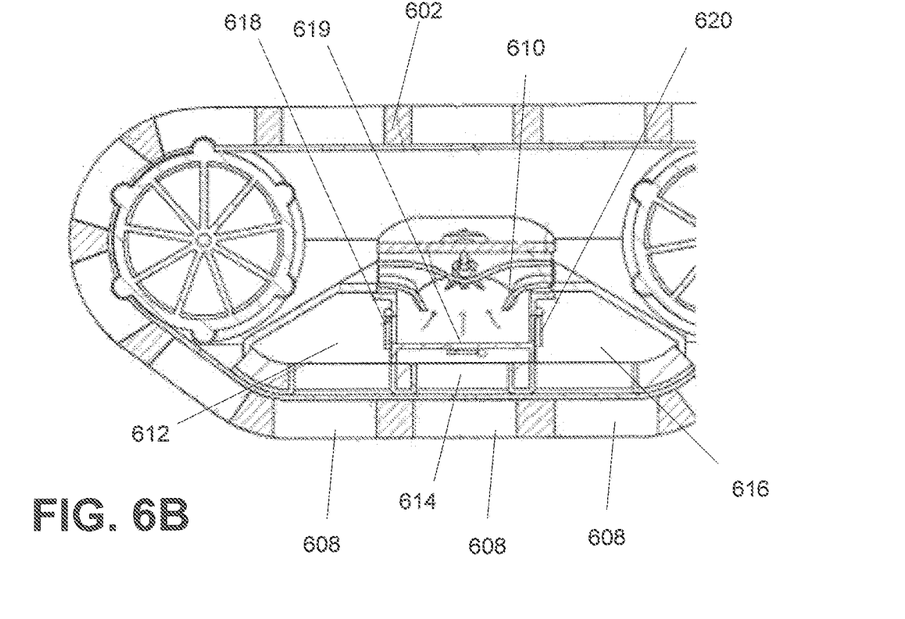
FIG. 6B is a cross sectional view of the drive unit of FIG. 6A.

FIG. 6B is a cross sectional view of the drive unit 600. The vacuum motor 610 provides three vacuum chambers 612, 614 and 616 which align with holes 608 on a planar bottom surface of the drive unit 600 to establish a suction attachment at each hole. A first valve 618 selectively opens the vacuum chamber 612 to the vacuum motor 610 when the vacuum chamber 612 is above a predetermined threshold pressure. Similarly, a second valve 620 selectively opens the vacuum chamber 616 to the vacuum motor 610 when the vacuum chamber 616 is above the predetermined threshold pressure. A third valve 619 selectively opens the vacuum chamber 614 to the vacuum motor 610 when the vacuum chamber 614 is above the predetermined threshold pressure.

Figure 7:
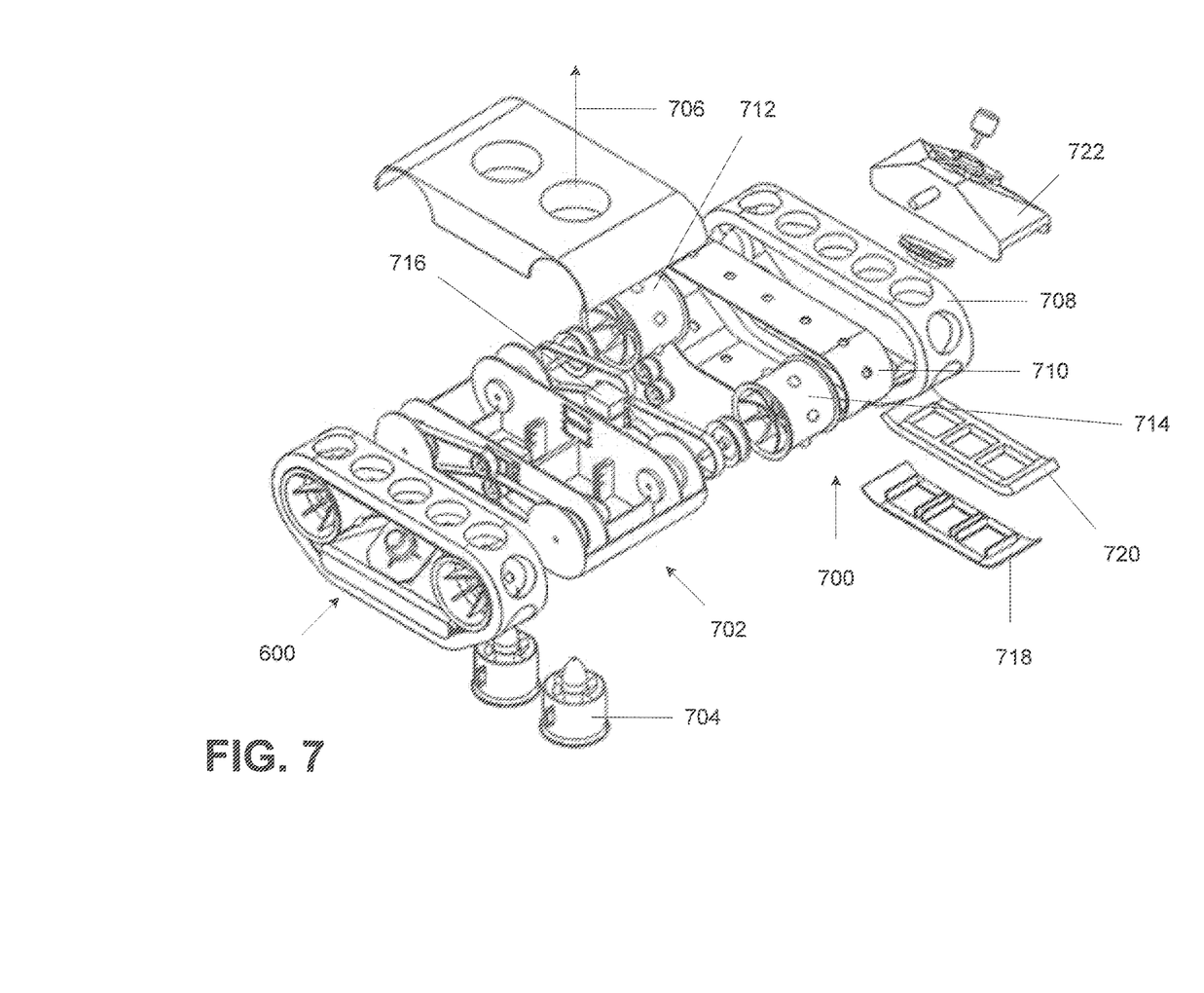
FIG. 7 is an exploded view of the third exemplary robot of FIG. 5.

FIG. 7 is an exploded view of the robot 500. The robot 500 comprises the drive unit 600, a second drive unit 700 (shown in exploded view) that is substantially identical to the drive unit 600 and a body 702. The body 702 comprises at least one turbine 704 that passes air in the direction of arrow 706, thereby pushing the robot 500 toward the planar bottom surface of the drive units 600, 700. The turbine can also be activated by an electric control system to rotate at higher speeds to generate extra force that presses the robot 500 toward the contact surface. An endless tread 708 frictionally engages a notched belt 710 that is driven by a pair of wheels 712, 714. The pair of wheels 712, 714 are driven by a drive motor 716. Teeth on the pair of wheels engages notches in the notched belt 710. A metal (e.g. steel) slider 718 is provided to form a bottom edge of the vacuum chambers 612, 614 and 616. The endless tread 708 is drawn against the flat edge of the metal slider 718 the force of the vacuum to provide a seal. An upper plate 720 fits atop the metal slider 718 to provide structural rigidity to the metal slider 718 and securely attach a vacuum motor 722 thereto.

The endless treads may be made of a flexible foam material such as an elastomeric film. Such a flexible foam material promotes the formation of vacuum seals and permits the robot to traverse surfaces with minor irregularities without a substantial loss of section attachment.

The body of the robot may be equipped with non-destructive testing equipment or other payload. Examples of non-destructive testing equipment includes ground penetration radar (GPR), video cameras, ultrasonic probes, and the like. The robots provide a means for navigating such equipment over an inclined surface such as glass buildings, windmill towers, water dams and the like.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A drive unit for driving a robot, the drive unit comprising:
   a pair of wheels rotatably disposed relative to a body;
   an endless tread engaging the pair of wheels to define a planar bottom surface of the endless tread, the endless tread having a plurality of holes with at least three holes in the plurality of holes being on the planar bottom surface;
   a vacuum motor connected to a vacuum chamber with an opening that is aligned with the planar bottom surface such that the vacuum motor pulls air through at least one aligned hole when aligned with the opening, the at least one aligned hole being selected from the at least three holes;
   wherein the opening is provided on an underside of the drive unit and comprises a first vacuum chamber and a second vacuum chamber, the first vacuum chamber and the second vacuum chamber each having a width substantially equal to the width of the endless tread, the first vacuum chamber and the second vacuum chamber being disposed adjacent one another such that each hole in the plurality of holes sequentially passes over the first vacuum chamber and then the second vacuum chamber during actuation of the pair of wheels.

2. The drive unit as recited in claim 1, wherein the vacuum chamber comprises at least one support structure disposed within the vacuum chamber that contacts the endless tread and prevents the endless tread from collapsing inward when the vacuum motor is active.

3. A robot for navigating inclined surfaces, the robot comprising:
   a body disposed between a first drive unit and a second drive unit;
   the first drive unit and the second drive unit each comprising:
      a pair of wheels, including a first wheel and a second wheel, rotatably disposed relative to the body;
      an endless tread engaging the pair of wheels to define a planar bottom surface of the endless tread, the endless tread having a plurality of holes with at least three holes in the plurality of holes being on the planar bottom surface;
      a vacuum motor connected to a vacuum chamber with an opening that is aligned with the planar bottom surface such that the vacuum motor pulls air through at least one aligned hole when aligned with the opening, the at least one aligned hole being selected from the at least three holes;
      wherein the opening is provided on an underside of the drive unit and comprises a first vacuum chamber and a second vacuum chamber, the first vacuum chamber and the second vacuum chamber each having a width substantially equal to the width of the endless tread, the first vacuum chamber and the second vacuum chamber being disposed adjacent one another such that each hole in the plurality of holes sequentially passes over the first vacuum chamber and then the second vacuum chamber during actuation of the pair of wheels;
      a turbine for expelling air in a direction opposite the planar bottom surface such that the planar bottom surface is pushed toward an inclined surface.

4. The robot as recited in claim 3, wherein the turbine is disposed in the body.

5. The robot as recited in claim 3, wherein a motor mount is connected to an inner frame by a means for tensioning, the motor mount housing the second wheel, wherein actuation of the means for tensioning moves the motor mount to apply tension to the endless tread.

6. The robot as recited in claim 3, wherein the vacuum chamber has a width substantially equal to a width of the endless tread.

7. The robot as recited in claim 3, wherein the plurality of holes in the endless tread are arranged in at least two rows including a first row and a second row such that a first hole in the first row and a second hole in the second row both simultaneously contact the first vacuum chamber or the second vacuum chamber.

8. The robot as recited in claim 3, the robot comprising at least two vacuum chambers connected to the vacuum motor by a manifold, both vacuum chambers being aligned with the planar bottom surface.

9. The robot as recited in claim 3, wherein the second wheel is rotatable around a wheel hub, the wheel hub being fixedly connected to the body.

10. The robot as recited in claim 3, further comprising a tether cable connected to the robot at a first end of the tether cable and connected to a support structure at a second end of the tether cable.

11. The robot as recited in claim 3, wherein the endless tread comprises an elastomeric foam.

12. The robot as recited in claim 3, further comprising a drive motor that drives at least one wheel of the pair of wheels.

13. The robot as recited in claim 3, wherein the first vacuum chamber comprises at least one support structure disposed within the vacuum chamber that contacts the endless tread and prevents the endless tread from collapsing inward when the vacuum motor is active.

14. The robot as recited in claim 13, wherein the at least one support structure is disposed within a perimeter of the vacuum chamber.

15. The robot as recited in claim 13, wherein the at least one support structure is disposed within a perimeter of the vacuum chamber and is proximate a center of the vacuum chamber.

16. The robot as recited in claim 13, wherein the at least one support structure is disposed within a perimeter of the vacuum chamber and is an elongated rib that extends over a length of the vacuum chamber.

17. A robot for navigating inclined surfaces, the robot comprising:
  a body disposed between a first drive unit and a second drive unit, the body having at least one duct fan with an air intake on a bottom side of the body and an air exhaust on a top side of the body;
  the first drive unit and the second drive unit each comprising:
    an endless tread engaging a pair of rotatable drive wheels to define a bottom surface and a top surface of the endless tread, the endless tread having a plurality of holes;
    a vacuum motor connected to a vacuum chamber with an opening that is aligned with the planar bottom surface such that the vacuum motor pulls air in through the plurality of holes when the plurality of holes are aligned with the opening and supplies the air to the at least one duct fan in the body causing the duct fan to rotate and apply a force that presses the robot toward the bottom surface;
    wherein the opening is provided on an underside of the drive unit and comprises a first vacuum chamber and a second vacuum chamber, the first vacuum chamber and the second vacuum chamber each having a width substantially equal to the width of the endless tread, the first vacuum chamber and the second vacuum chamber being disposed adjacent one another such that each hole in the plurality of holes sequentially passes over the first vacuum chamber and then the second vacuum chamber during actuation of the pair of wheels.

18. The robot as recited in claim 17, further comprising a tether cable connected to the body at a first end of the tether cable and connected to a support structure at a second end of the tether cable.

* * * * *